United States Patent [19]

Sasaki et al.

[11] Patent Number: 4,714,171
[45] Date of Patent: Dec. 22, 1987

[54] FUEL TANK VENT SYSTEM

[75] Inventors: Michiaki Sasaki, Hadano; Junya Ohno, Zama, both of Japan

[73] Assignee: Nissan Motor Co., Ltd., Yokohama, Japan

[21] Appl. No.: 948,041

[22] Filed: Dec. 31, 1986

[30] Foreign Application Priority Data

Jan. 10, 1986 [JP] Japan .................................. 61-3010
May 6, 1986 [JP] Japan ............................... 61-103587

[51] Int. Cl.$^4$ ........................ F16K 45/00; B65B 31/00
[52] U.S. Cl. .......................... 220/85 VR; 220/85 VS; 220/86 R
[58] Field of Search ............ 220/85 VR, 85 VS, 86 R

[56] References Cited

U.S. PATENT DOCUMENTS

| 3,643,690 | 2/1972 | Sarai ................................ 220/86 R |
| 3,698,160 | 10/1972 | Hunter ....................... 220/85 VS X |
| 3,800,978 | 4/1974 | Sigwald ...................... 220/85 VS X |
| 3,804,291 | 4/1974 | Fricker ............................. 220/86 R |
| 3,817,421 | 6/1974 | Andres ........................... 220/85 VR |
| 3,917,109 | 11/1975 | MacDonald ................... 220/85 VS |
| 4,166,550 | 9/1979 | Kleinschmit et al. ......... 220/85 VR |
| 4,457,443 | 7/1984 | Casimir et al. ............ 220/85 VR X |
| 4,531,653 | 7/1985 | Sakata ........................... 220/85 VR |

*Primary Examiner*—Steven M. Pollard
*Attorney, Agent, or Firm*—Schwartz, Jeffery, Schwaab, Mack, Blumenthal & Evans

[57] ABSTRACT

Herein disclosed is a fuel tank vent system which comprises a fuel tank of moulded plastics which is formed with a depressed portion protruding into a vapor chamber defined at an upper portion of the interior of the fuel tank, and a structure of moulded plastics which is incorporated with the depressed portion to define an enclosed chamber at the position above the maximum level of fuel in the fuel tank. A first piping or opening is provided for achieving a fluid communication between an upper portion of the enclosed chamber and an upper portion of the vapor chamber, and a second piping or tube is provided for achieving a fluid communication between a lower portion of the enclosed chamber and a lower portion of the vapor chamber.

14 Claims, 8 Drawing Figures

FUEL TANK VENT SYSTEM

BACKGROUND OF THE INVENTION

1. Field of the Invention

The present invention relates in general to an evaporative emission control system of a motor vehicle, and more particularly to a fuel tank vent system which comprises a fuel tank and a vapor separator.

2. Description of the Prior Art

The fuel tank is vented to allow vapors and air to move in and out of the tank in order to keep the inside pressure nearly equal to the outside pressure as the vehicle goes up and down hills, as atmospheric pressures change, and as fuel is drawn from the tank. On emission control motor vehicles, the fuel tank is vented through a vapor separator and a carbon canister. The carbon canister traps the vapors to keep them from entering the atmosphere. On restarting of the engine, a flow of filtered air through the canister purges the vapors from the canister. The mixture goes through one or more tubes feeding into the carburetor and/or carburetor air cleaner and it is burned in the engine.

Usually, the vapor separator is a separate device which is mounted within the fuel tank, more specifically, at an upper vacant portion of the interior of the same. However, when the fuel tank is of one piece construction of moulded plastics, the work for mounting a vapor separator in the fuel tank requires the employment of skilled labor and time because of the indivisible construction of the tank. Although formation of a large opening in the upper wall of the tank may facilitate the work for inserting and assembling the separator in the tank, this method reduces the mechanical strength of the tank to a considerable degree.

SUMMARY OF THE INVENTION

It is therefore an essential object of the present invention to provide a fuel tank vent system which is free of the above mentioned drawbacks.

According to the present invention, there is provided a fuel tank vent system which comprises a fuel tank constructed of moulded plastics, the fuel tank being formed with a depressed portion which protrudes into a vapor chamber defined at an upper portion of the interior of the fuel tank, a structure of moulded plastics which is incorporated with the depressed portion to define an enclosed chamber at a position above the maximum level of fuel in the fuel tank, first means for providing a fluid communication between an upper portion of the enclosed chamber and an upper portion of the vapor chamber, and second means for providing a fluid communication between a lower portion of the enclosed chamber and a lower portion of the vapor chamber.

DETAILED DESCRIPTION OF THE INVENTION

Figure 1:
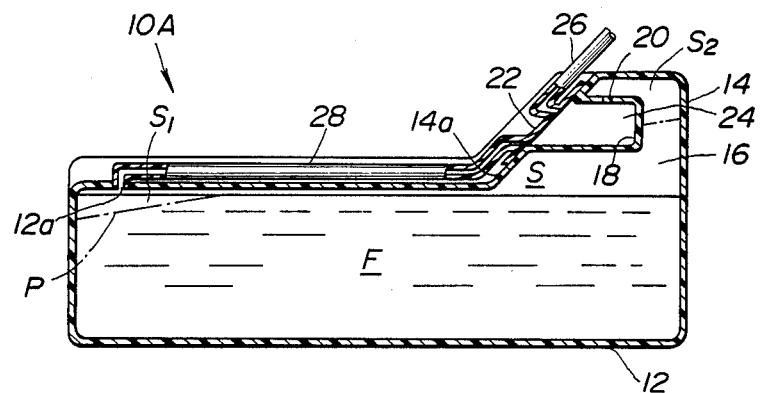
FIG. 1 is a sectional view of a separator-mounted fuel tank which cobstitutes a fuel tank vent system of a first embodiment of the present invention.
Figure 2:
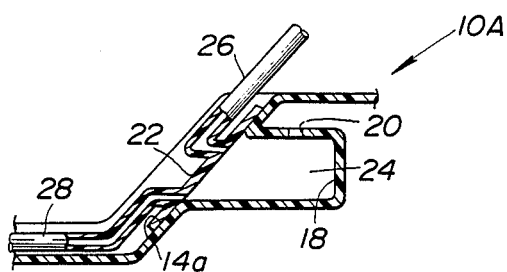
FIG. 2 is an enlarged sectional view of the part where the vapor separator is provided.
Figure 3:
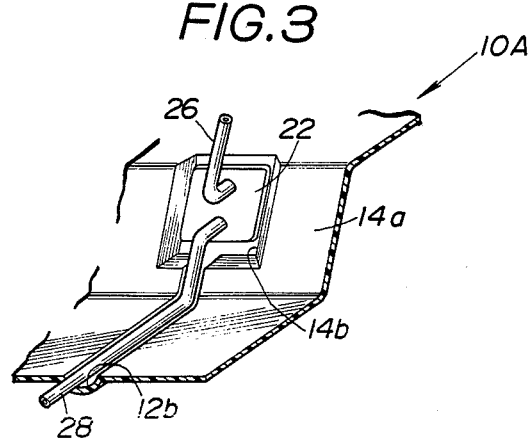
FIG. 3 is a perspective view of the part where the vapor separator is provided.

Referring to FIGS. 1 to 3, particularly FIG. 1, there is shown a separator-mounted fuel tank 10A which constitutes a fuel tank vent system of a first embodiment of the present invention.

The fuel tank vent system 10A comprises a fuel tank 12 of moulded plastics and a vapor separator integrally mounted to the tank 12. Because of its complicated configuration, a blow moulding technique is used for production of the fuel tank 12.

For ease of description, the fuel tank 10A shown in FIG. 1 is herein assumed to be mounted in a vehicle with its left side, as viewed in the drawing, facing forward of the vehicle. Thus, the left and right side portions as viewed in FIG. 1 are respectively meant as front and rear portions with respect to the vehicle.

As shown, the fuel tank 12 is formed at its right side with an upward swelled portion 14 which defines therewithin a so-called "vapor chamber" 16 when the tank 12 is filled with a fuel "F". The vapor chamber 16 is remained even when the tank 12 is maximumly filled with the fuel "F".

The swelled portion 14 is formed at its front inclined wall 14a with a deepened recess 18 which protrudes into the vapor chamber 16, as shown. At least one opening 20 is formed in an upper wall of the recess 18 in order to provide fluid communication between the interior of the tank 12 and the interior of the recess 18.

A lid member 22 of moulded plastics is sealingly attached to the front inclined wall of the swelled portion 14 to cover the recess 18. With this, an enclosed chamber 24 is defined by the recess 18 and the lid member 22, which serves as the vapor separator as will become apparent as the description proceeds. As is best seen from FIG. 2, the lid member 22 has first and second tubes 26 and 28 which are integral therewith and extend therefrom. The first tube 26 is exposed to an upper portion of the enclosed chamber 24 and extends to a carbon canister (not shown) of an emission control system. The second tube 28 is exposed to a lower portion of the enclosed chamber 24 and extends therefrom forward and connects to an opening 12a formed in a front upper wall of a non-swelled major portion of the tank 12. It is to be noted that the opening 12a is located near the left or forward edge of the tank 12. As is seen from FIG. 3, the front inclined wall 14a of the swelled portion 14 and the upper wall of the non-swelled major portion are respectively formed with a rectangular recess 14b and a groove 12b for receiving therein the lid member 22 and the second tube 28. With these recesses 14b and 12b, positioning of the lid member 22 and the tube 28 relative to the tank 12 is facilitated.

When, with the vehicle parked on a horizontal place, the fuel "F" is contained in the tank 12 to such an amount that a considerable vacant space "S" is remained in the fuel tank 12 as shown in FIG. 1, vapors produced in the space "S" are led into the enclosed chamber 24 through the second tube 28 and the opening 20 of the recess 18, and the vapors are then led through the first tube 26 to the carbon canister and trapped by the same.

When the vehicle is parked on a slope with its front portion raised, the space "S" is divided into two portions $S_1$ and $S_2$ by a part of the tank 12 protruding into the space "S", one portion $S_1$ appearing at the forward end of the tank 12 and the other portion $S_2$ appearing at an upper part of the swelled portion 14 as will be understood from the inclined fuel level illustrated by a phantom line "P" in FIG. 1. However, even under this condition, the two vacant portions $S_1$ and $S_2$ are kept in communication with the enclosed chamber 24 through the second tube 28 and the opening 20 respectively. Thus, the vapor flow toward the carbon canister is normally carried out. Furthermore, this phenomenon induces smooth refueling of the vehicle under parking on a slope.

When the vehicle encounters rapid starting, rapid braking or the like, the fuel "F" is forced into the enclosed chamber 24 due to the force of inertia of the fuel. However, the fuel "F" in the enclosed chamber 24 instantly returns to the fuel tank proper 12 through the second tube 28 by its own weight when the vehicle posture is returned to its normal one.

Thus, the enclosed chamber 24 can serve as the vapor separator which separates vapors from the liquid state fuel "F".

As will be understood from the above description, the work for assembling the vapor separator can be easily made from the outside of the fuel tank 12. This facilitates the production process of the separator-mounted fuel tank. Since the fuel tank 12 does not need formation of a large opening for the work of assembling the separator in the tank, the mechanical strength of the tank is not deteriorated. Furthermore, the provision of the recesses 14b and 12b to the fuel tank 12 protects the lid member 22 and the second tube 28 from conflicting with neighbouring parts.

Figure 4:
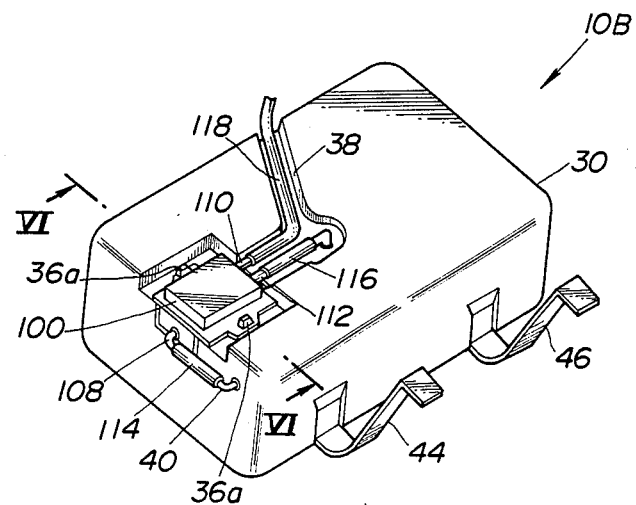
FIG. 4 is a perspective view of a separator-mounted fuel tank which constitutes a fuel tank vent system of a second embodiment of the present invention.
Figure 5:
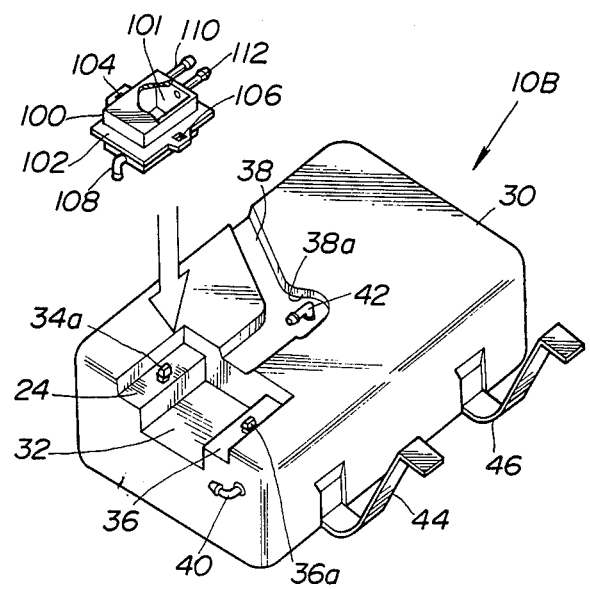
FIG. 5 is a perspective view of the fuel tank of the second embodiment with the a separator dismantled from the fuel tank.
Figure 6:
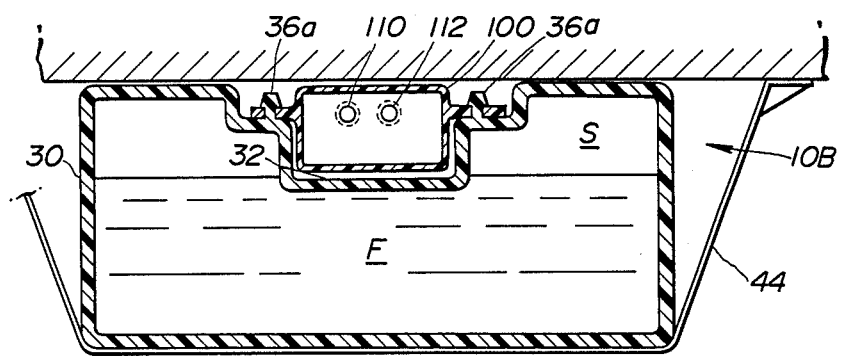
FIG. 6 is a sectional view taken along the line VI—VI of FIG. 4.

Referring to FIGS. 4 to 6, there is shown a separator-mounted fuel tank 10B which constitutes a fuel tank vent system of a second embodiment of the present invention.

The fuel tank vent system 10B of this second embodiment comprises a fuel tank 30 of moulded plastics and a separate vapor separator 100 of moulded plastics which is detachably mounted on the fuel tank 30 in a manner as will be described hereinafter.

As is best seen from FIG. 5, an upper wall of the tank 30 is substantially flat and formed with a generally rectangular recess 32 near its front edge. The recess 32 has spaced stepps 34 and 36 which are raised from the bottom of the recess 32. Each step 34 or 36 is formed with a latching pawl 34a or 36a projected upward. The upper wall of the tank 30 is further formed with a groove 38 which extends from the rectangular recess 32 to one lateral side of the tank 30 through a bent portion 38a thereof.

First and second connectors 40 and 42 are secured to a front wall of the tank 30 and the bent portion of the groove 38a, which are exposed at their inward ends to an upper vacant space "S" (see FIG. 6) in the tank 30. If desired, the first connector 40 may be secured to the bottom of the recess 32.

The vapor separator 100 is a separate device which has a flange 102 integrally formed thereabout. The flange 102 has openings 104 and 106 at its laterally opposed portions. A third connector 108 is connected to the separator 100 and exposed to a lower portion of the chamber 101 of the separator 100, and fourth and fifth connectors 110 and 112 are connected to the separator 100 at a position remote from the third connector 108 and exposed to an upper portion of the chamber 101.

As is understood from FIG. 4, upon assemblage, the vapor separator 100 is disposed in the rectangular recess 32 of the tank 30 having the openings 104 and 106 thereof lockingly engaged with the locking pawls 34a and 36a. The first and third connectors 40 and 108 are connected through a short pipe 114, and the second and fifth connectors 42 and 112 are connected through another short pipe 116. A long pipe 118 extends from the fourth connector 110 to a carbon canister (not shown) of an emission control system. It is to be noted that the rectangular recess 32 and the groove 38 are so sized and deepened that the parts, such as the separator 100 and the pipes 116 and 118, placed therein do not project from the upper surface of the fuel tank 30.

Designated by numerals 44 and 46 are holding bands for mounting the fuel tank 30 to a bottom portion of a vehicle body. The substantially flat upper surface of the tank 30 as mentioned hereinabove assures the mounting of the tank 30 to a flat bottom portion of the vehicle body.

With the above-mentioned arrangement of the second embodiment 10B, vapors produced in the space "S" (see FIG. 6) are led into the vapor separator 100 through the pipes 114 and 116, and the vapors are then led into the carbon canister through the pipe 118. Even when the fuel "F" is forced to enter the separator 100 due to rapid starting, rapid braking or the like, the fuel "F" instantly returns to the fuel tank 30 through the pipe 114 when the vehicle posture is returned to its normal position.

Similar to the case of the first embodiment 10A, the work for assembling the vapor separator 100 can be made from the outside of the fuel tank 30. Furthermore, the provision of the recess 32 and the groove 38 to the tank 30 protects the vapor separator 100 and the pipes 116 and 118 from conflicting with neighbouring parts of the vehicle.

Figure 7:
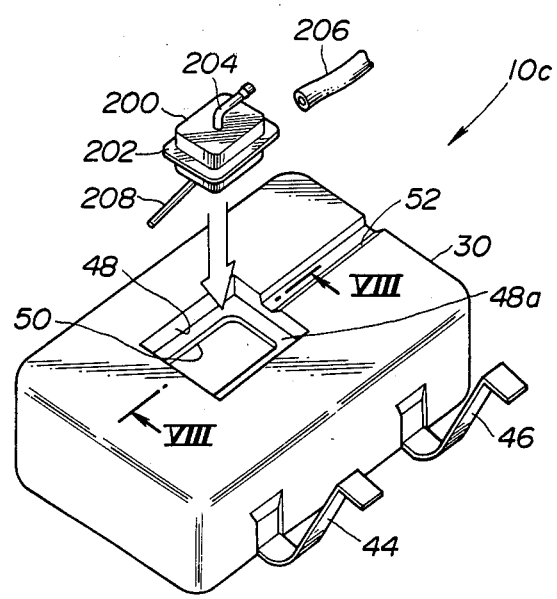
FIG. 7 is a view similar to FIG. 5, but showing a third embodiment of the present invention.
Figure 8:
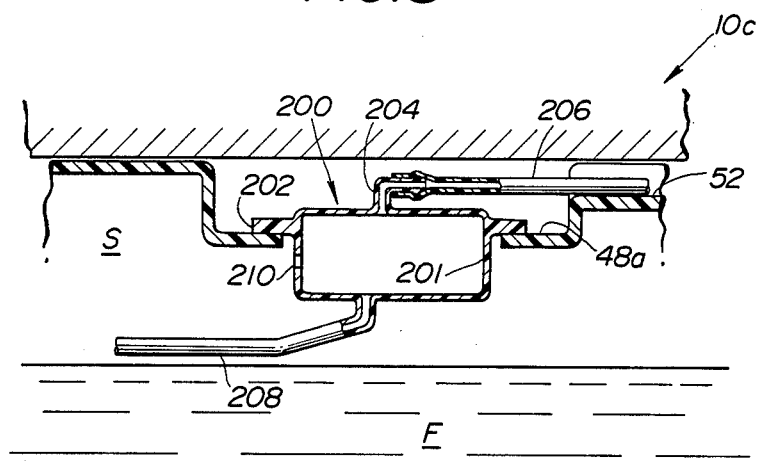
FIG. 8 is a sectional view taken along the line VIII—VIII of FIG. 7.

Referring to FIGS. 7 and 8, there is shown a separator-mounted fuel tank 10C which constitutes a fuel tank vent system of a third embodiment of the present invention.

The fuel tank vent system 10C of this embodiment comprises a fuel tank 30 of moulded plastics and a separate vapor separator 200 of moulded plastics which is mounted on an upper wall of the fuel tank 30 in a manner as will be described hereinafter.

As is seen from FIG. 7, the upper wall of the fuel tank 30 is substantially flat and formed with an apertured rectangular recess 48, leaving a flat flange 48a about the aperture 50. The upper wall of the fuel tank 30 is further formed with a straight groove 52 which extends from the recess 48 to a rear end of the tank 30, as shown.

The vapor separator 200 is a separate device which has a flange 202 integrally formed thereabout. The flange 200 is sized to be neatly put on the flange 48a of the recess 48. A connector 204 is integrally connected to an upper wall of the separator 200 and exposed to the upper portion of the separator chamber 201 (see FIG. 8). An elongate tube 208 is integrally connected to a bottom wall of the separator 200 and exposed to a lower portion of the separator chamber 201. The separator 200 is further formed with an opening 210 at a position below the flange 202.

Upon assemblage, the separator 200 is placed in the recess 48 of the tank 30 with the flange 202 thereof put on the flange 48a of the tank 30. A suitable adhesive is applied to the contacted flanges to achieve tight connection therebetween. If desired, supersonic welding may be employed for such connection. As is seen from FIG. 8, the recess 48 of the tank 30 is so sized and deepened that upon assemblage, the connector 204 does not project from the upper major surface of the tank 10. A pipe 206 is connected to the connector 204 and extends therefrom to a carbon canister (not shown) of an emission control system. The pipe 206 is neatly received in the groove 52 of the tank 30 in a manner not to project from the upper surface of the tank 30. The elongate tube 208 extends to a given portion of the vacant space "S" which is remained even when the tank 30 is maximumly filled with the fuel "F".

With the above-mentioned arrangement of the third embodiment 10C, under normal condition, the vapors produced in the space "S" (see FIG. 8) are led into the vapor separator 200 through the opening 210 and the tube 208, and the vapors are then led into the carbon canister through the pipe 206. Even when the fuel "F" is forced to enter the separator 200 due to rapid starting, rapid braking or the like, the fuel "F" instantly returns to the fuel tank 30 through the tube 208 when the vehicle posture is returned to its normal position.

Also in this third embodiment, the work for assembling the vapor separator 200 can be made from the outside of the fuel tank 30. Furthermore, the direct exposure of the lower portion of the vapor separator 200 to the interior of the fuel tank 30 makes the piping between the vapor separator 200 and the fuel tank 30 unnecessary. These induce reduction in production cost of the fuel tank. Furthermore, the provision of the recess 48 and the groove 52 to the tank 30 protects the separator 200 and the pipe 206 from conflicting with neighbouring parts. Since the opening 50 of the tank 30 is not used for passing the entire assembly of the separator therethrough but for mounting thereon the assembly, formation of a large opening is not necessary in this third embodiment. Thus, deterioration of the mechanical strength of the tank 30 is minimized or negligible. The bonding between the flange 202 of the separator 200 and the flange 48a of the tank 30 promotes this minimization.

What is claimed is:

1. A fuel tank vent system comprising:
    a fuel tank constructed of moulded plastics, said fuel tank being formed with a depressed portion which protrudes into a vapor chamber defined at an upper portion of the interior of the fuel tank;
    a structure of moulded plastics which is incorporated with said depressed portion to define an enclosed chamber at a position above the maximum level of fuel in the fuel tank;
    first means for providing a fluid communication between an upper portion of said enclosed chamber and an upper portion of said vapor chamber; and
    second means for providing a fluid communication between a lower portion of said enclosed chamber and a lower portion of said vapor chamber.

2. A fuel tank vent system as claimed in claim 1, in which said structure is a lid member which is attached to said fuel tank to sealingly cover said depressed portion to define said enclosed chamber.

3. A fuel tank vent system as claimed in claim 2, in which said first means comprises an opening formed in a wall of said depressed portion, and in which said second means comprises a pipe integrally connected to said lid member, said pipe having one end exposed to the lower portion of the enclosed chamber and the other end exposed to the lower portion of said vapor chamber.

4. A fuel tank vent system as claimed in claim 3, in which said fuel tank is formed with a recess and a groove for receiving therein said lid member and said pipe respectively.

5. A fuel tank vent system as claimed in claim 1, in which said structure is a separate chamber member which is detachably mounted in said depressed portion of the fuel tank.

6. A fuel tank vent system as claimed in claim 5, in which said first means comprises a piping which has one end exposed to an upper portion of the interior of said chamber member and the other end exposed to the upper portion of said vapor chamber, and in which said second means comprises a piping which has one end exposed to a lower portion of the interior of said chamber member and the other end exposed to the lower portion of said vapor chamber.

7. A fuel tank vent system as claimed in claim 6, in which said separator chamber member is integrally formed with connectors to which said pipings are detachably connected.

8. A fuel tank vent system as claimed in claim 7, in which said fuel tank is integrally formed with connectors to which said pipings are detachably connected.

9. A fuel tank vent system as claimed in claim 8, in which said separate chamber member is formed with a flange which has locking openings, and in which said depressed portion of the fuel tank is formed with locking pawls which are lockingly engaged with the openings of the flange of the chamber member upon proper mounting of the chamber member in said depressed portion.

10. A fuel tank vent system as claimed in claim 9, in which said separate chamber is disposed in said depressed portion in a manner not to project from the upper major surface of said fuel tank.

11. A fuel tank vent system as claimed in claim 10, in which said fuel tank is formed with a groove for receiving therein one of said pipings.

12. A fuel tank vent system as claimed in claim 1, in which said depressed portion is formed at its bottom wall with an aperture, and in which said structure is a separate chamber member which is disposed in said depressed portion with its lower portion projected into said vapor chamber of the fuel tank through said aperture.

13. A fuel tank vent system as claimed in claim 12, in which said first means comprises an opening formed in said lower portion of said separate member, and in which said second means comprises a tube which is integrally connected to a bottom wall of said separate member, said tube having one end exposed to a lower portion of the interior of said chamber member and the other end exposed to the lower portion of the vapor chamber.

14. A fuel tank vent system as claimed in claim 13, in which said depressed portions is formed with a flange about said aperture, and in which said chamber member is formed thereabout a flange which is put on and bonded to said flange of said depressed portion upon mounting of said chamber member in said depressed portion.

* * * * *